Nov. 18, 1952 P. R. HOFFMAN 2,618,362
TRUCK LOCK
Filed March 7, 1951 2 SHEETS—SHEET 1
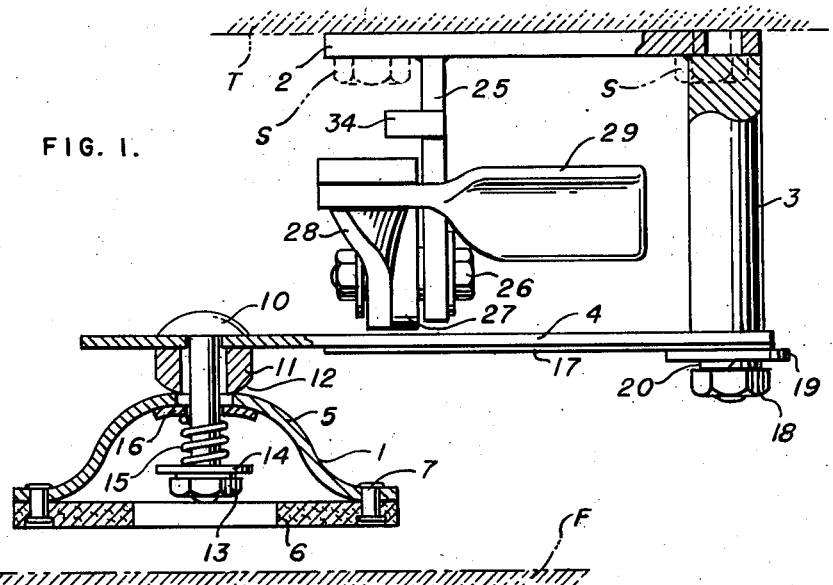
FIG. 1.
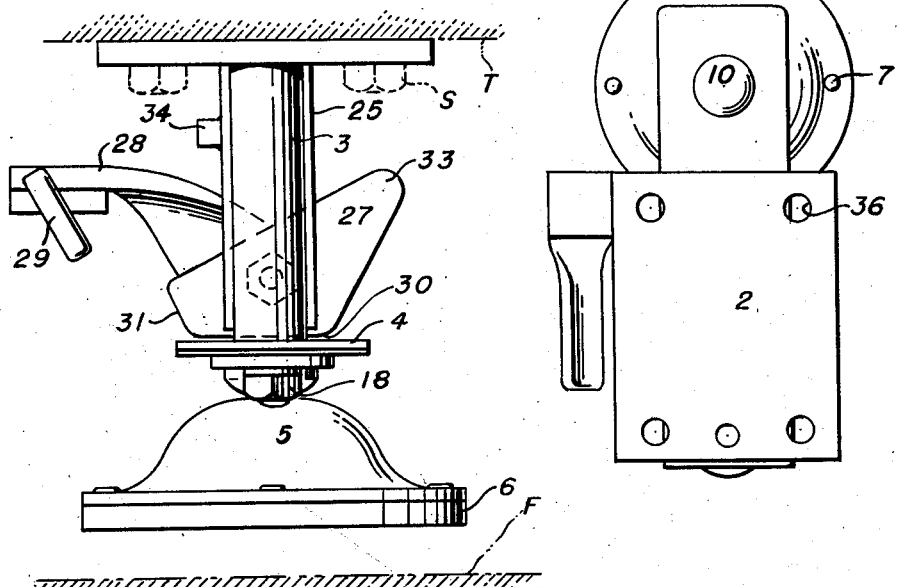
FIG. 2.
FIG. 3.
Inventor
PAUL R. HOFFMAN
By George K. Hellwig
Attorney Inventor
PAUL R. HOFFMAN
Attorney Patented Nov. 18, 1952

2,618,362

UNITED STATES PATENT OFFICE 2,618,362

TRUCK LOCK

Paul R. Hoffman, Manheim, Pa., assignor to Bond Foundry & Machine Company, Manheim, Pa., a corporation of Pennsylvania Application March 7, 1951, Serial No. 214,419

2 Claims. (Cl. 188—5)

This invention is directed to means for holding a wheeled truck or the like stationary when desired as during loading and unloading of material, the mechanism embodying releasable means engageable with the floor or other supporting surface and providing frictional resistance to movement of the truck relatively thereto.

Truck locks of various kinds usually employing a plunger vertically movable with respect to the truck and coil springs for yieldingly pressing it against the floor have been suggested and some of these have been reasonably satisfactory under certain conditions. However the coil springs are subject to breakage, sometimes quickly lose their initial resiliency due to internal fatigue of the metal of which they are made and are difficult to keep clean while the devices as a whole are quite complicated and expensive to manufacture.

It is therefore a principal object of the invention to provide improved means for positively holding a truck or the like in position on the floor which are readily releasable to permit its movement in the normal manner when desired.

A further object is to provide a novel truck lock embodying a leaf spring operative to hold a floor-engaging foot in raised position when the lock is inoperative and when depressed to yieldingly press the foot against the floor to hold the truck in place.

Other objects, purposes and advantages of the invention will hereafter more fully appear or will be understood from the following description of a preferred embodiment of it wherein reference will be had to the accompanying drawings in which Fig. 1 is a side elevation partly in section of the truck lock with a truck body and the supporting floor level indicated in broken lines to show their relative positions when the lock is attached to the truck but inoperative.

Fig. 2 is an end view of the lock shown in Fig. 1.

Fig. 3 is a top plan view of the lock removed from the truck and illustrated on a smaller scale than in the other figures.

Figure 4:
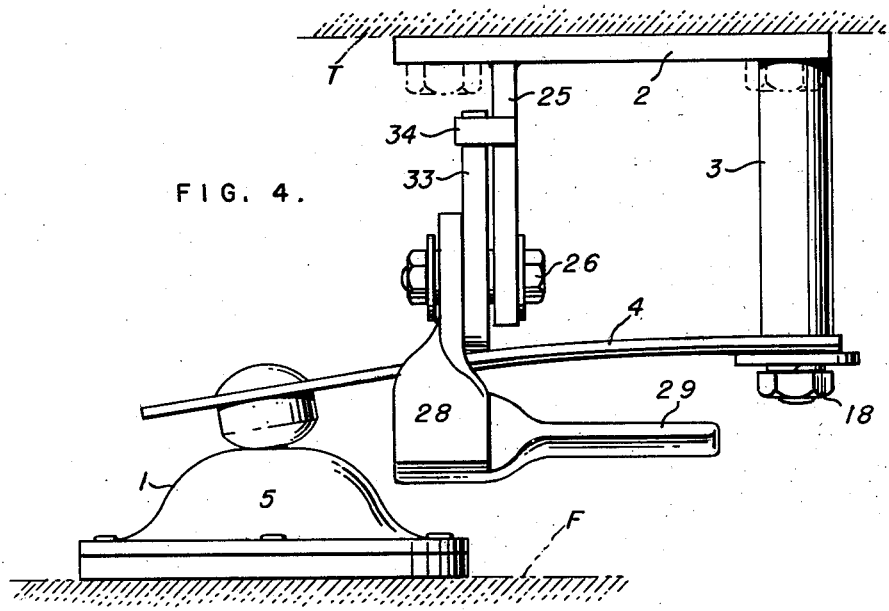
Fig. 4 is a side elevation corresponding to Fig. 1 but showing the lock in operative or floor-engaging position.

Referring now more particularly to the drawings, the truck lock illustrated therein is adapted for securement to the under side of the body or other suitable part of a truck T in a position such that the floor-engaging foot of the lock, generally designated 1, is carried a short distance above the floor line F when inoperative and is movable into engagement with the floor when the lock is operated as hereinafter more fully described.

The lock in general comprises a top plate 2 supporting a downwardly depending post 3 which carries adjacent its lower end a substantially horizontally extending leaf spring 4 adjacent the free end of which is supported the foot 1. This foot includes a generally substantially bell shaped cap 5 having an annular flange at its lower end carrying a facing 6 of friction material such as that used for automotive brake and clutch linings, the facing being secured to the cap flange by countersunk rivets 7 or in any other suitable way. The cap 5 is loosely connected to the spring 4 by means of a bolt 10 passing through the spring and cap as well as through a bushing 11 interposed between these parts, the bushing having a generally substantially semi-spherical lower face 12 adapted to permit limited universal movement of the cap relatively thereto to adjust the position of the foot to the slope and contour of the floor. The cap is loosely positioned on the bolt 10 and is yieldingly secured thereto by a nut 13 bearing on a washer 14 embracing a coil spring 15 interposed between the latter and a second washer 16 surrounding the bolt just under the cap.

The leaf spring 4 is desirably supplemented by a shorter spring leaf 17 secured to the post 3 and reinforcing and stiffening the spring 4, both leaves being secured to the post by a nut 18 threaded on its lower extremity, a washer 19 and lock washer 20 preferably being interposed between the nut and the springs.

Figure 5:
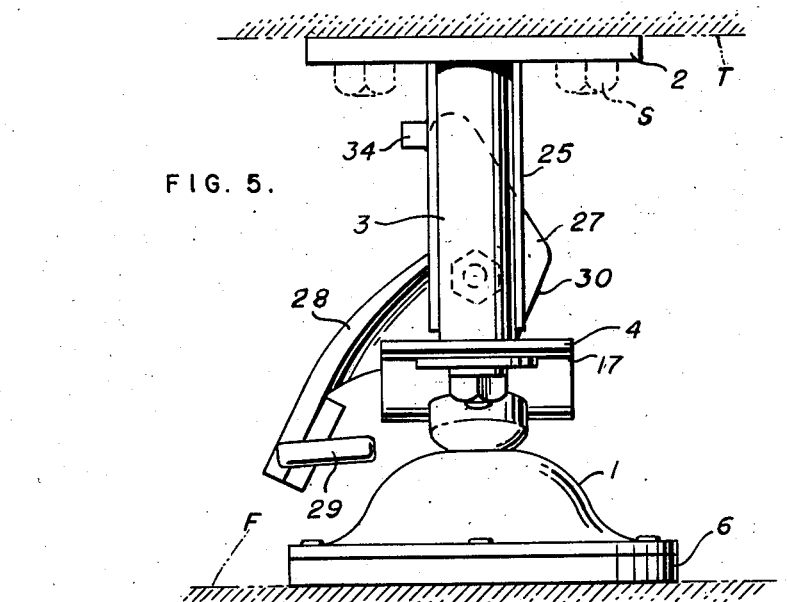
Fig. 5 is a view corresponding to Fig. 2 but illustrating the parts in the position assumed in Fig. 4.

For operating the lock to depress the foot 1 into engagement with the floor F when the truck is to be held against movement thereon a depending arm 25 is welded or otherwise secured to the plate 2 and supports on a pivot bolt 26 a foot 28 operated actuating cam 27 to which is rigidly attached an arm extending generally horizontally when the foot 1 is inoperative and provided with a foot treadle 29 for rotating the cam about the axis of the pivot bolt by pressure of the operator's foot to move the cam and associated parts from the position illustrated in Fig. 2 to that illustrated in Fig. 5. The cam is provided with a substantially rectilinear face 30 disposed at an angle to another substantially rectilinear face 31 more remote from the axis of rotation of the cam, the second face 31 being adapted when brought into engagement with the spring 4 through rotation of the cam to hold the spring depressed below the normal horizontal position it occupies when the lock is inoperative, such depression of the spring thereby yieldingly pressing the floor engaging foot 1 against the subjacent floor. The yieldability of the spring 4 permits the required frictional engagement with the floor to be maintained even though the latter be irregular while the universal action of the foot relatively to the bolt 10 insures engagement of the entire lower face of the friction lining of the foot with the floor surface whether or not the local contour of the latter is precisely horizontal.

An integral arm 33 projecting from the cam substantially diametrically opposite its face 31 is adapted to engage a stop 34 on the arm 25 to hold and thus limit rotation of the cam in one direction with cam face 31 in engagement with the spring 4 which prevents the cam passing over center beyond the rotational position at which face 31 holds the foot 1 depressed (Figs. 4 and 5), the cam operating treadle 29 being disposed angularly to arm 28 for convenient actuation in opposite directions by the operator's foot.

It will of course be appreciated that when the lock is assembled with the truck the top plate of the lock is secured to the bed of the truck by suitable cap screws extended through holes 35 in the plate or in any other suitable manner and that when so positioned the lock becomes essentially a permanent part of the truck; if desired however the post 3 and arm 25 may be welded or otherwise secured directly to the truck during the course of manufacture and the plate therefore either omitted or merged with the bed plate of the truck.

It is thus evident I have devised an extremely rugged, easily operated and serviceable truck lock embodying a minimum of parts, of a character unlikely to get out of order, extremely easy to clean after dust and dirt have accumulated on it and positive in its action, the lock being adapted for quick and easy actuation to yieldingly hold its floor-engaging foot firmly against the floor under adequate pressure to insure the requisite frictional resistance to movement of the truck but on the other hand adapted to be quickly and conveniently released to allow it to restore itself to inoperative condition when the truck is to be moved.

While I have herein shown and particularly described a preferred embodiment of the invention it will be understood I do not thereby desire or intend to limit or confine myself thereto in any way since changes and modifications in the form, construction and relationship of the several parts other than as herein suggested will readily occur to those skilled in the art and may be made if desired without departing from the spirit and scope of the invention as defined in the appended claims.

Having thus described my invention, I claim and desire to protect by Letters Patent of the United States:

1. A truck lock including a leaf spring supported adjacent one end by the truck and extending substantially horizontally adjacent the truck supporting surface, a bolt passing through the spring adjacent its opposite end, a bushing provided with a convex surface surrounding the bolt, a substantially bell shaped cup carried by the bolt and loosely secured thereto, a spring surrounding the bolt and urging the cup into engagement with the bushing, means providing a friction surface carried by the cup and adapted to engage the supporting surface, means depending from the truck including a rotatable cam adapted to engage the leaf spring intermediate its ends, a treadle rigid with the cam operable to actuate it to flex the leaf spring and thereby press said friction means into engagement with the supporting surface and a stop engageable by the cam for limiting its rotational movement in one direction to thereby hold said friction means yieldingly in engagement with said surface.

2. A truck lock as defined in claim 1 in which the cam is rotatable about a horizontal axis parallel to the plane of movement of the leaf spring.

PAUL R. HOFFMAN.

REFERENCES CITED

The following references are of record in the file of this patent:

UNITED STATES PATENTS

| Number | Name | Date |
| --- | --- | --- |
| 2,200,935 | Rodriquez | May 14, 1940 |
| 2,360,874 | Herold | Oct. 24, 1944 |